United States Patent

[11] 3,615,674

[72] Inventors Edwin J. Bass
St. Paul;
William R. Johnston, Wayzata, both of Minn.
[21] Appl. No. 753,407
[22] Filed Aug. 19, 1968
[45] Patented Oct. 26, 1971
[73] Assignee International Multifoods Corporation
Minneapolis, Minn.

[54] PROCESS FOR BLENDING SELECTED FRACTIONS OF CEREAL GRAIN AND USE THEREOF
9 Claims, 1 Drawing Fig.
[52] U.S. Cl. .................................................. 99/80,
99/28, 99/56, 99/78, 99/85, 99/124, 99/139
[51] Int. Cl. ......................................................... A23l 1/10,
A23l 1/14, A23l 1/16
[50] Field of Search ............................................. 99/80, 93,
93 A, 90 HP, 85

[56] References Cited
UNITED STATES PATENTS
2,303,448 12/1942 Fisher et al. .................. 99/93 X
OTHER REFERENCES
Sherwood et al., " General Mills, Inc., Research Laboratories," Minneapolis, Minnesota, Nov. 1941 Pages 811– 817

*Primary Examiner*—Raymond N. Jones
*Attorney*—Dugger, Peterson, Johnson & Westman ABSTRACT: A process of blending selected fractions of a given cereal grain, to obtain a better balance of nutrient properties than obtained from the whole grain flour from said cereal grain. One blend is obtained through combining wheat fractions: second clear, wheat germ and millfeed. The blend is further processed by heating and increasing its moisture content to form pellets and then ground to provide a processed blend that is selectively converted into a base for soup, pudding, beverage, etc. through adding flavoring and/or coloring materials; or ground and then through the addition of other materials and further processing, converted into a pasta-like product.

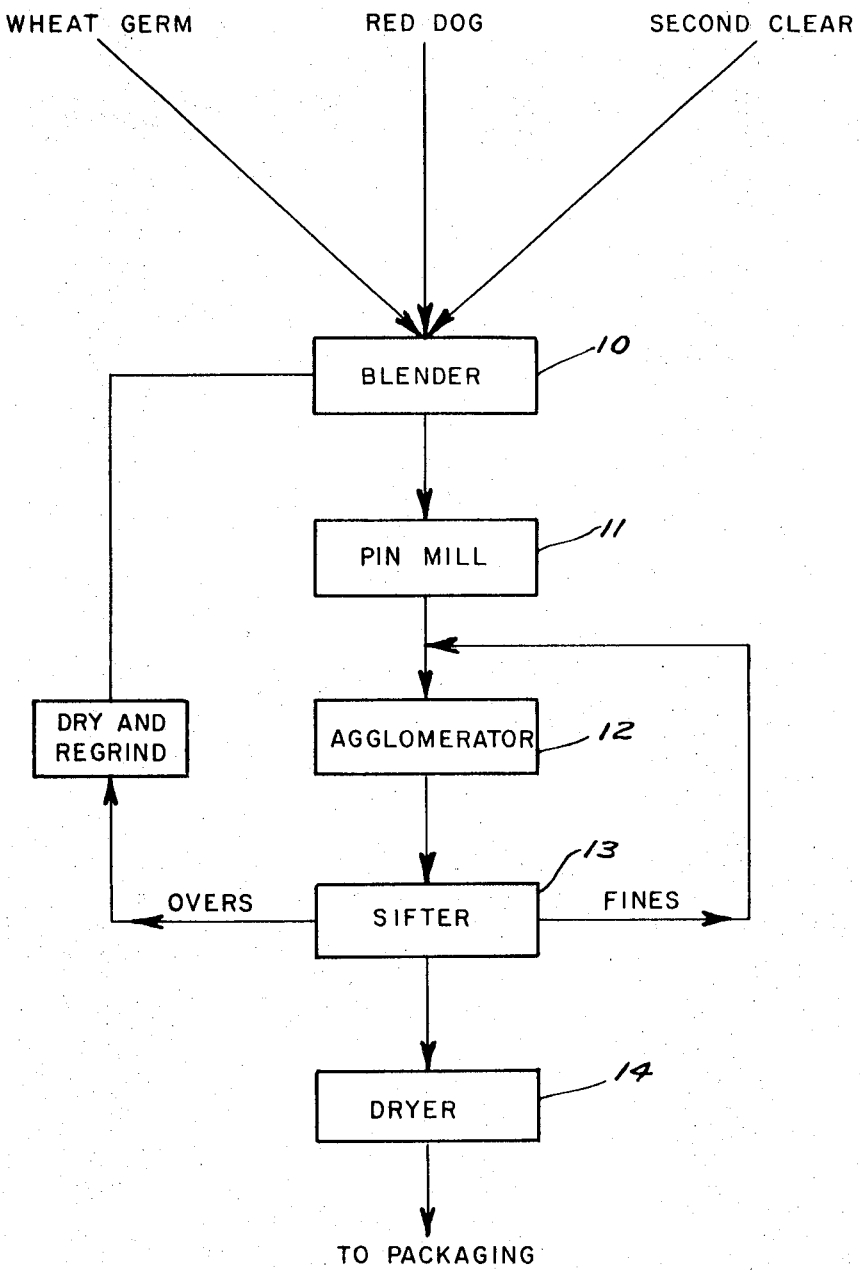

PROCESS FOR BLENDING SELECTED FRACTIONS OF CEREAL GRAIN AND USE THEREOF

BACKGROUND OF THE INVENTION

A formulation of a balanced-protein blend of milled fractions of wheat, oats, or corn, processes whereby the blend is manufactured into foods, and composition of examples of such foods.

It has been previously proposed to combine corn meal, wheat flour, nonfat dry milk and soy grits to obtain a balanced-protein "complete" food in order to help alleviate the world shortage of food, particularly of high quality protein food. However, such a proposal is subject of disadvantages as follows:

a. The four protein-contributing ingredients (corn meal, wheat flour, nonfat dry milk, soy grits) come from four different sources which may not all be indigenous to a developing country.

b. The practice of producing, blending, and processing four ingredients from four different sources can be relatively inefficient and uneconomical.

C. The blended product may prove unacceptable in countries where, for example, wheat is the principal staple cereal grain.

D. The blended product is unlikely to have the functional properties of wheat flour which are required to process it into customary forms of wheaten foods, particularly bread and other leavened products.

In order to over come problems of the above-mentioned nature, this invention has been made.

SUMMARY OF THE INVENTION

The invention relates to recombining constituent fractions of a cereal grain in such a way as to render the combination well balanced in terms of biological food valve (i.e. caloric content, protein content, protein quality, fiber content and nutrient availability). More specifically the invention is directed to a basic blend of fractions of milled wheat, the wheat fractions being wheat germ, red dog or similar floury millfeed, and second clear flour or other high-ash and high-protein flour streams. The basic blend may be baked as a flour, mixed with water and served as a gruel, used as a high quality protein ingredient in formulated foods, or further processed and formulated into one or more foods such as follows: couscous type product, pastalike products, weaning food, soup mix, hot breakfast cereal, beverage mix and pudding mix.

One of the objects of the invention is to provide a basic product (Basic Blend), with at least 20 percent well balanced-protein and other desirable nutrients, in the form of a blend of milled fractions of a cereal grain, for example wheat, which fractions are normally priced no higher than bread grade flours or other premium products produced in the milling process. Another object of the invention is to provide a new and novel process of manufacture for converting the Basic Blend into a variety of acceptable food forms.

BRIEF DESCRIPTION OF THE DRAWINGS

The sheet of drawings summarizes the various steps in forming a couscous type product.

All plant seeds contain an embryo, which is essentially a miniature plant, and an endosperm which serves as a food supply for the growing embryo. In wheat, the embryo in known as "wheat germ" and the endosperm is the source of white flour. In the milling of white flour from wheat, most of the materials which form the outer layers of the seed kernel (including the germ) are or can be separated from the endosperm and collected as "millfeeds".

The protein of white flour (endosperm) is superior to the protein of millfeeds (including germ) in baking quality, but the reverse is true in terms of potential nutritional value of the protein. The chief reason for the potential nutritional superiority of millfeed protein in its higher content of protein, wherein the essential amino acids (particularly lysine and tryptophan) are present in much higher proportions than they are in white flour or in whole wheat. Nevertheless, with the exception of wheat germ (which is regarded by many as a "health" or "fad" food and some bran (which is used in some cold breakfast cereals), very little millfeed is used in customary human foods, perhaps because its relatively high fiber content presumably makes its potential nutrients difficulty accessible to the human digestive system.

To provide an economical wheat base of relatively high-protein value biologically, selected wheat fractions, which originate in other parts of the kernel 15 the endosperm, are in accordance with this 70 blended in such a way as to optimize the following characteristics: high-protein, favorable amino acid balance, low fiber, and relatively low cost of ingredients. In the case of wheat, this combination of desired properties can best be realized by blending wheat germ and another millfeed fraction with relatively high-ash and high-protein flour fractions. These flour fractions may be found in flour streams which are normally blended to produce patent flour and/ or in flour streams which are normally blended to produce second clear grade flour and/or feed flour. Removal of these streams, which have poor breadmaking quality, from patent flour might improve the breadbaking performance of the patent flour. Thus, diversion of high-ash, high-protein flour streams from patent grade and second clear flour streams both upgrades the breadbaking performance of the patent flour and together with wheat germ and another millfeed fraction, extends the overall utilization of the wheat for human consumption in all types of flour milling except of whole wheat flour.

If constituted as described above, the blend of selected wheat fractions, which is referred to in the specification and claims as "Basic Blend," contains the desirable nutrient properties in better balance with respect to human nutrition requirements than in either white flour or whole wheat flour as follows: protein, fat, fiber, energy, minerals, and vitamins.

COMPOSITION OF BALANCED-PROTEIN BLEND OF MILLED

FRACTIONS OF WHEAT (BASIC BLEND)

The Basic Blend which is composed of milled fractions of wheat, which in accord with USDA guidelines for new protein foods designed for developing countries, has the properties as follows:

a. Protein content (N×6.25) of about 20 percent to 22 percent, dry basis, b. Lysine content of about 0.8 percent to 1.0 percent, dry basis, c. Fiber content of about 1.5 percent to 2.0 percent, dry basis, and d. The cost of each fraction not to exceed the normal cost of premium milled products.

To achieve this desirable combination of properties, the Basic Blend is prepared by mixing the following three wheat fraction, after they have been analyzed for amino acids (or at least the amino acid lysine), in the proportion necessary to optimize the combination of properties set forth in the preceding paragraph:

A. High-ash, high-protein flour stream. On a conventional wheat flour mill, this stream (or these streams) is (or are) selected from flour streams which are usually blended into a flour described as "second clear flour" or "second clears." Portions of such streams may also find their way into "first clear flour" (or "first clears"), and even into patent grade flours. In nonconventional wheat flour mills, the required flour stream or streams may occur anywhere in the mill where there is a facility to extract flour, the source of which is substantially from the outer layers of the endosperm of the wheat kernel, rather than from the interior portions of the endosperm which are the source of premium baking grade flours. Whatever their source, the required flour streams (including second clears) are characterized by the following properties, which may be used as criteria for selecting these flour streams by analysis of all flour streams in the mill:

1. Relatively High-Protein Content. In general, such streams contain at least 2 percent more protein than is present in the final flour milled from the selected wheat. For example, when a 13 percent protein patent grade flour is being produced, high-protein streams can be isolated in which protein content is at least 15 percent. Similarly, when a 9 percent protein flour is being produced, high-protein streams of at least 11 percent protein can be isolated. In general, then, it is desirable to isolate those high-protein flour streams in which the protein content exceeds the protein content of the patent flour being produced by as much above 2 percent as is possible.

2. Relatively High-Ash Content. In general, ash contents of high-protein flour streams are about twice as high as in patent grade flours. Thus, ash contents may vary from about 0.6 percent to 1 percent.

3. Relatively High Fiber Content. Similarly, fiber contents of high-protein flour streams are generally about twice as high as in patent grade flours, and may vary from about 0.6 percent to about 1 percent.

B. Wheat Germ. This is a conventional wheat fraction which can be isolated in any conventional wheat flour mill. High purity wheat germ (germ which has been maximally separated from adhering bran) is preferred to achieve maximum protein content and minimum fiber content in the final blend, but commercial germ may also be used if fiber content in the final blend is not too critical.

C. Millfeed Fraction. A relatively low fiber millfeed fraction is selected to minimize the cost of ingredients in the final blend. The extent to which this fraction can be selected for high-protein and low fiber will determine the extent to which the higher cost flour and wheat germ fractions described above can be "spared" by this millfeed fraction. The conventional millfeed known as Red Dog ("Flour Middlings" in Canada; "Superfine Weatings" or "Fine Middlings" in the United Kingdom; "Remoulage" in France, Belgium and The Netherlands; "Tritello" in Italy, and "weizenfuttermehl" in Germany or one or more of the feed streams which are blended in the mill to produce Red Dog (or its equivalent in terms of composition) may be satisfactory for the purpose of this invention.

The actual composition of the Basic Blend in terms of the above three ingredients will depend on the combination of the four properties (protein content, lysine content, fiber content, and ingredient cost) desired in the blended product, and on the analysis of available ingredients. In terms of specifications like those listed at the beginning of this description, and of a typical ingredient analysis like that listed in Table I, a "least cost analysis" may be used to determine that combination of the three ingredients which will satisfy composition specifications at a minimum ingredient cost. In the present example, the optimum composition in round numbers is: second clears, 65 percent; wheat germ, 25 percent; red dog, 10 percent. Table II compares the analysis of Basic Blend based on ingredient analysis with actual chemical analysis.

TABLE I.—EXAMPLE OF INGREDIENT ANALYSIS [1]

| Ingredient | Moisture percent | Ash, percent | Protein,[2] percent | Fat, percent | Fiber, percent | Lysine, percent | Relative cost (rank) |
|---|---|---|---|---|---|---|---|
| Second clears | 12.3 | 1.16 | 16.4 | 2.26 | 0.63 | 0.37 | 1 |
| Wheat germ | 11.9 | 4.53 | 28.0 | 11.9 | 2.99 | 1.68 | 2 |
| Red dog | 12.1 | 3.24 | 18.1 | 3.65 | 3.35 | 0.74 | 3 |

[1] As is moisture basis.
[2] N×6.25.

TABLE II.—ANALYSIS OF BASIC BLEND BASED ON INGREDIENTS ANALYSES

| | 65% second clears | 25% wheat germ | 10% red dog | Total | Basic blend analyses | |
|---|---|---|---|---|---|---|
| | | | | | As is | Dry basis |
| Moisture, percent | 8.00 | 3.97 | 1.21 | 13.2 | 11.7 | |
| Protein, percent | 10.7 | 7.0 | 1.8 | 19.5 | 18.7 | 21.2 |
| Lysine, percent | 0.24 | 0.42 | 0.07 | 0.73 | 0.70 | 0.79 |
| Fat, percent | 1.47 | 2.98 | 0.36 | 4.8 | 4.7 | 5.3 |
| Fiber, percent | 0.41 | 0.75 | 0.34 | 1.5 | 1.5 | 1.7 |

The high nutritional value of the Basic Blend, particularly the protein thereof, is well illustrated in the typical data shown in Table III.

TABLE III.—NUTRITION INDICES FOR BASIC BLEND

| | Chick tests | | Rat tests | |
|---|---|---|---|---|
| Nutrition index | Casein [1] | Basic blend | Casein | Basic blend |
| Metabolizable energy (M.E.) kcal./lb., dry basis | | 1,511 | | |
| Protein efficiency ratio (PER) | 2.5 | 2.5 | 2.5 | 2.3 |
| Net protein utilization (NPU), percent | 45.7 | 56.0 | 50.3 | 45.5 |
| Nitrogen digestibility [2], percent: | | | | |
| Apparent | | | 88.1 | 84.6 |
| Corrected for N-free diet | | | 95.4 | 92.0 |
| Corrected for 4% pro diet | | | 96.6 | 93.4 |

[1] Supplemented with amino acids to meet chick requirements.
[2] Corresponding values for soybean meal are: 80.3%; 88.9%; 90.4%.

When the selected ingredients differ appreciably in analysis from the ingredients described in Table I, the optimum composition of the Basic Blend must be determined separately for each set of appreciably different ingredients. To be mentioned is that the Basic Blend may be fortified with vitamins and minerals in amounts calculated to make the product more or less a "complete" food.

With reference to wheat, the Basic Blend usually would by made up of 20–25 percent wheat germ, 10–15 percent red dog and 60–70 percent second clears.

The general principal of blending selected fractions from the milling (wet or dry) of a cereal grain in order to provide a basic flourlike material of relatively high-protein content of high nutritional quality, relatively low fiber, and relatively low cost, is also applicable to other cereal grains like corn, oats, rice, and sorghum. Consequently, any variation of the present invention in which at least one of the aforementioned cereal grains is used instead of wheat may be considered an embodiment of the present invention.

PROCESS FOR CONVERTING BASIC BLEND INTO PROCESSED BASIC BLEND

Ingredients of the Basic Blend are mixed for about 20 minutes in an appropriate mixer or blender such as a Strong-Scott mixer (Model 0IMSJ). Water (10 percent with respect to solids) is sprayed into the mix with the steam applied through the cover into the product to provide a final mix temperature of 214° F. and a final moisture of 17.1 percent in the product. The hot mix is passed through a California (or similar) pellet mill (such as California pellet mill Model 0CH-FB), using a ⅛th inch die which produces pellets approximately ⅛×½ inch in size. The pellets are dried at 140° F. to a final moisture of 5.0 percent in a suitable air oven such as the Proctor-Schwartz (Machine 0K14357). The dried pellets are then finely ground in an appropriate mill. For example, using a Fitz Mill, Model 0D, the mill is set for high speed, impact forward, and the material is passed three times through the 01 screen. It is then sifted through 0110 Nitex screen. Using a pin mill, such as Alpine Model 0160Z, the material is milled at high speed through gate 02, and then is sifted through 0110 Nitex screen. The fines (throughs) are collected for conversion to products such as a creamy soup base, a pudding mix base, smooth gruel or weaning of infant food, a hot beverage mix base, a milk extender and a cold beverage mix base, examples of these products being set forth below.

It is anticipated that the same result could be achieved by passing the Basic Blend through other cooking-extrusion equipment such as the Wenger Extrusion Cooker (e.g. Model 0X-25), followed by fine grinding and sifting as above.

The Basic Blend thus steam-and-pressure processed will be referred to as Processed Basic Blend."

Various combinations of the Processed Basic Blend and other ingredients to form food bases and its manner of use are set forth in the examples that follow.

Example 1–Composition of Creamy Soup Mix

The Processed Basic Blend makes an excellent base for a highly nutritious, smooth, creamy-type soup mix containing flavorings and stabilizers (if necessary). One example of the composition and preparation of such a soup is given next. The nutritional value of this product, and of products of Examples 2–6 below, is illustrated in Table IV.

| Ingredient | % |
| --- | --- |
| Processed Basic Blend | 87.95 |
| Imitation Chicken Flavor | 8.00 |
| Imitation Spice Blend | 4.00 |
| Diastatic Enzyme | 0.05 |
| | 100.00 |

To prepare a highly nutritious and tasty soup from the above dry mix, one part of the dry mix is mixed with four parts of cold water, heated to boiling with stirring, then simmered for 5 minutes.

TABLE IV.—NUTRITION INDICES FOR STEAM-AND-PRESSURE-PROCESSED BASIC BLEND

| Nutrition index | Chick tests | | Rat tests | |
| --- | --- | --- | --- | --- |
| | Casein [1] | Basic blend | Casein | Basic blend |
| Metabolizable energy (M.E.) kcal./lb. dry basis | | 1,729 | | |
| Protein efficiency ratio (PER) | 2.5 | 1.9 | 2.5 | 2.3 |
| Net protein utilization (NPU), percent | 45.7 | 44.2 | 50.3 | 41.0 |
| Nitrogen digestibility [2], percent: | | | | |
| Apparent | | | 88.1 | 86.0 |
| Corrected for N-free diet | | | 95.4 | 93.9 |
| Corrected for 4% pro diet | | | 96.6 | 95.4 |

[1] Supplemented with amino acids to meet chick requirements.
[2] Corresponding values for soybean meal are: 80.3%; 88.9%; 90.4%.

Example 2–Composition of Pudding Mix

The Processed Basic Blend also makes an excellent base for a highly nutritious pudding containing flavorings and stabilizers (if necessary). One example of the composition and preparation of such a pudding is given next.

| Ingredient | % |
| --- | --- |
| Processed Basic Blend | 95.0 |
| Salt | 2.8 |
| Flavor | 1.2 |
| Cyclamate/Saccharin Blend | 1.0 |
| | 100.0 |

One part of the above mix is mixed with 2 parts cold water into a smooth paste. Six additional parts of water are added, the mixture is heated to boiling, simmered 5 minutes with stirring, then left to set in the desired containers at room temperature or in a refrigerator.

Example 3–Composition of Smooth Gruel or Weaning Food

The Processed Basic Blend provides an excellent base for a highly nutritious smooth gruel or weaning food. Salt is added in the amount of 4 parts per 100 parts of Processed Basic Blend. Sugar and/or artificial sweeteners are optional ingredients, as are other flavorings.

The product is prepared for consumption by dispersing it in cold water, bringing the mixture to a boil, then simmering for 5 minutes with continuous stirring. It is suggested that 1 cup of Processed Basic Blend be used to 4 cups of water, but the amount of water may be varied according to the desired gruel consistency.

Example 4–Hot Beverage Mix Base

The Processed Basic Blend makes an excellent base for highly nutritious hot beverages, one example of which is given next.

| Ingredient | % |
| --- | --- |
| Processed Basic Blend | 98.47 |
| Cyclamate/Saccharin Blend | 0.78 |
| Cinnamon-Prune Flavor | 0.70 |
| Diastatic Enzyme | 0.05 |
| | 100.00 |

Example 5–Composition of Powdered Milk Extender

The Processed Basic Blend may be used in admixture with powdered nonfat dry skim milk, thereby reducing the amount of powdered milk required for nutritional food use. One example of admixture is given next.

| Ingredient | % |
| --- | --- |
| Nonfat Dry Skim Milk, Extra Grade, Low Heat | 74.7 |
| Processed Basic Blend | 24.6 |
| Carrageenan | 0.7 |
| | 100.0 |

The admixture is reconstituted with water to 11.25 percent solids.

Example 6–Composition of Cold Beverage Mix

The Processed Basic Blend, when formulated with flavorings and stabilizers, can be provided in the form of a nutritious and tasty "instant" (i.e., cold-water-dispersible) beverage. One example of a chocolate-flavored beverage mix is given next.

| Ingredient | % |
| --- | --- |
| Processed Basic Blend | 66.8 |
| Sugar, 6X | 20.0 |
| Cocoa, Dutched | 5.0 |
| Carrageenan | 2.0 |
| Silicon Dioxide | 2.0 |
| Imitation Chocolate Flavor | 1.5 |
| Imitation Vanilla Flavor | 1.5 |
| Salt | 0.8 |
| Imitation Milk Flavor | 0.2 |
| Calcium Cyclamate | 0.2 |
| | 100.0 |

Any of the products made with the Processed Basic Blend may be made with flavors other than those set forth in the above examples. Also, relatively more or less flavor and/or flavor enhancer may be used according to regional taste and flavor enhancers may be used in addition to, or in partial replacement of the flavors set forth in the above examples or other flavors.

COMPOSITION OF, AND PROCESS FOR MANUFACTURING, PASTALIKE PRODUCTS

Because the Basic Blend contains appreciable quantities of bran associated with the germ and red dog fractions of wheat, and because it lacks the bright yellow color of durum semolina, the following modifications in the treatment of ingredients of the Basic Blend, in the composition of the material to be processed into pasta, and in the pasta manufacturing process itself are necessary to ensure pastalike products which are satisfactorily similar in appearance and cooking properties to corresponding pasta products manufactured from durum semolina:

a. Basic Blend Processing. Although the composition of the Basic Blend is unchanged, the wheat germ and red dog fractions must first be finely pulverized to prevent deleterious effects on the texture and appearance of the finished pasta. This may be accomplished, for example, by pin milling such as on an Alpine pin mill, Model 0160Z, at 18,000 r.p.m. The specification for the finely pulverized material is as follows:

wheat germ—minimum of 3 percent through 070 Standard U.S. Sieve
    maximum of 11 percent over 040 Standard U.S. Sieve
red dog—minimum of 10 percent through 070 Standard U.S. Sieve
    100 percent through 040 Standard U.S. Sieve b. Composition. In general, two food grade coloring ingredients are added. The first, titanium dioxide, masks the brown color imparted to the Basic Blend by the branny ingredients (wheat germ and red dog). The second, a yellow dye (e.g. Yellow 05) imparts the desired degree of yellow color to the Basic Blend and to the finished pastalike product. Typical compositions of typical pasta products are shown in Table V. The products referred to as Langues d'Oiseaux and Shorba are grain-shaped or ovoid pasta products popular in Tunisia where they are consumed principally in soup. They may be considered to be characteristic of a class of pastalike products of grainlike structure (e.g. like rice) which can be consumed in soups, in casseroles, or as vegetable side dishes in a manner analogous to the forms in which rice, bulgur, and similar traditional grains are customarily consumed. Shorba are about 4.3 mm. long and about 1.9 mm. thick in the center; corresponding dimensions for Langues d'Oiseaux are about 8.9 mm. and about 2.3 mm.

Quantities of titanium dioxide in excess of the proportions listed in Table V will cause serious loss of cooking quality of the pastalike products.

c. Process. Conventional pasta extrusion processes are used for production of pastalike products from the Basic Blend, but traditional pasta drying procedures (cycles of varying temperature and relative humidity) will not produce satisfactory products. Instead, single-temperature and single-humidity drying conditions are required. As shown in Table V, the most satisfactory drying conditions for conventional pastalike products are: 20 hours drying time at 110° F. at 70 percent relative humidity (100° F. wet bulb temperature). For grainlike products, a 140° F. circulating air oven (e.g. Proctor Schwartz, Machine No. K14357) is most satisfactory, and drying time will vary according to grain size. Thus the larger Langues d'Oiseaux requires 3 hours drying time, whereas the smaller Shorba are dry in 2.5 hours, at 140° F.

PROCESS FOR PRODUCING OF COUSCOUS TYPE PRODUCT

Referring to the drawings, the wheat germ, red dog and second clears are mixed in a blender 10 to to provide the Basic Blend of a composition such as described heretofore. The Basic Blend is finely ground in a reduction mill such as an Alpine pinmill (Model 01602) operating at a high speed (approximately 18,000 r.p.m.

The pinmilled Basic Blend is fed to an agglomerator 12 such as a Dravo Disc Agglomerator (manufactured by the Dravo Corporation, Philadelphia, Pennsylvania). Water is sprayed onto the rotating dry material in the proper proportions to form the desired size of pellets. Pellet size can be controlled by (a) disc speed, (b) disc angle, (c) total feed rate, (d) position of the water and dry mix feed in relation to the face of the disc.

The pellets from the disc are sifted into selected sizes on a vibratory sifter 13 such as a Sweco vibroenergy separator. The fines from the sifter can be recycled to the blender or with adequate feed control directly recycled to the agglomerator. The overs of the sifting are in small quantity and may not be economical to reclaim. The overs can be reclaimed, however, by drying, grinding and recycling to the blender.

The selected sizes of wet pellets (approximately 25 percent moisture) from the sifter are dried in a dryer 14 by conventional hot air drying procedures. In a conventional tray such as a Proctor-Schwartz (Machine No. K14357) unit, the product must be stirred constantly to minimize lump formation. The optimum temperature for the tray drying is about 250° F. The drying process must be carried to the light toasting stage, i.e. the product is a light golden brown with a moisture level <1 percent. With incomplete drying and/or toasting, a sticky product with a gummy eating quality results. Properly toasted the couscous type product, when completely steamed by the normal cooking process, gives discrete spheres (nonsticky) with a mouth feel similar to steamed rice.

Disc speed, disc angle, total feed rate, and position of the water and dry mix feeds in relation to the face of the disc of the agglomerator can all be varied to achieve a desired predominant particle size. Optimum conditions must be determined separately for each desired predominant particle size. Usually, a change in one condition will necessitate changes in

TABLE V

| Product | Ingredient concentration (percent of basic blend) | | | Drying conditions | | |
| --- | --- | --- | --- | --- | --- | --- |
| | Water | Titanium dioxide | Yellow No. 5 | Time, hours | Temp., °F. | Relative humidity, percent |
| Spaghetti [1] | 30 | 0.125 | 0.014 | 20 | 110 | 70. |
| Soup noodles | 30 | 0.125 | 0.014 | 3 | 110 | 70. |
| Langues d'Oiseaux | 30 | 0.5 | 0.008 | 3 | 140 | Dry air [2]. |
| Shorba | 30 | 0.5 | 0.008 | 3 | 140 | Dry air [2]. |

[1] And other conventional pasta products.
[2] In a circulating air oven eg. Proctor-Schwartz Machine No. K14357.

one or more of the other conditions in order to achieve a desired effect on particle sizes.

The following examples provide optimum conditions for achieving two different predominant particle sizes, when using a 14-inch Dravo disc pilot unit.

| Average pellet size | Medium, through U.S. Standard No. 8 Sieve on U.S. Standard No. 10 Sieve | Extra fine through U.S. Standard No. 16 Sieve on U.S. Standard No. 20 Sieve |
|---|---|---|
| Disc speed, r.p.m. | 34 | 45 |
| Disc angle (from horizontal) ° | 43 | 52 |
| Feed rate of dry mix, pound/min | 0.50 | 0.56 |
| Clock position of water feed [1] | 11:00 | 11:00 |
| Clock position of dry feed | 6:00 | 6:00 |

[1] Water feed rate was held constant at 0.162 pound/min.

Drying temperatures may be varied from as low as 170° F. to as high as 350° F. depending on economics of the process and minimum damage to nutritive properties. The optimum conditions must be established for each type of drying equipment to be employed.

Example 7—Composition of Hot Breakfast Cereal

A tasty and nutritious hot breakfast cereal resembling a porridge can be formulated by mixing Basic Blend with the couscous type product. One such formulation is given next.

| Ingredient | % |
|---|---|
| Basic Blend | 74.0 |
| Couscous type product | 20.0 |
| Salt | 5.0 |
| Disodium Phosphate, Anhydrous Powder | 1.0 |
| | 100.0 |

One part of the above mixture is mixed with about 6 parts of cold water (more or less depending on the desired final consistency), heated to boiling with stirring, then simmered for 5 minutes. The hot breakfast cereal may be served as is or with milk and/or sugar to taste.

Relative quantities of couscous type product and Basic Blend, as well as particle size of the couscous type product, may be varied to achieve varying degrees of chewiness and toasted cereal flavor. For example the Basic Blend may be mixed with 10-50 percent of the couscous type product.

The principal foreseeable advantage of this invention is that all principal ingredients for all products resulting from this invention are derived from one source—in the case of what, the wheat mill which mills wheat into flour, Thus, the practice of procuring, blending, and processing can be much more efficient, simple, and economical than is possible when ingredients must be obtained from various sources, and the blend of ingredients and the finished products can have the character and acceptability of wheat products.

Because of the presence of an appreciable proportion (about 25 percent) of wheat germ, the fat content of which is high in unsaturated fats, it was anticipated that the Basic Blend and most, if not all, of the products manufactured from the Basic Blend would rapidly become rancid during storage under normal conditions. Even whole wheat flour, which theoretically contains only about 2 percent wheat germ, can be stored for only relatively short periods of time before it will become rancid. Unexpectedly, the Basic Blend was found to be stable when stored for long periods of time even under adverse conditions. Similarly, all products described in this invention, except couscous type product prepared by agglomeration, were found to be equally stable. Couscous type product was stable for about 2 months when stored in polyethylene at room temperature, but became rancid rapidly thereafter, and in less time when stored at 100° F. On the basis of other product development research, it is anticipated that if the wheat germ is autoclaved for 30 minutes at 121° C. (15 p.s.i.) and dried prior to pin milling, the storage stability of couscous type product will be improved to the level of the other products described in this invention.

Typical storage stabilities of various products, as judged by odor and taste of the dry and prepared products, were determined. No evidence of rancidity or serious off-odors or off-flavors were detected under the storage conditions described in Table VI.

TABLE VI

| Product | Storage time, months | | | |
|---|---|---|---|---|
| | Walk-in freezer [1] | Room temp. | Climatizer [2] | 100° F. |
| Basic blend | 3 | 7 | 3 | 7 |
| Processed basic blend and product prepared therefrom | 3 | 7 | 3 | 7 |
| Pasta | 3 | 3 | 3 | 3 |

[1] Although no tests were performed beyond 3 months, it is clear that stability would extend for an indefinite period beyond the period of stability at room temperature.
[2] 12 weeks in climatizer is equivalent to 12 weeks in Jacksonville, Florida or 1 year in normal distribution in the U.S.

We claim:
1. A process for making a food produce from wheat comprising selecting a high-protein second clear milled fraction, a wheat germ fraction and a relatively low fiber millfeed fraction, blending said fractions in proportions of about 20-25 percent of the wheat germ fraction, 60-70 percent of the second clear fraction and 10-15 percent of the low fiber fraction to obtain a Basic Blend product, finely grinding the Basic Blend product, agglomerating the finely ground particles, and drying the agglomerated particles at a temperature in the range of about 170° F. to 350° F., to a moisture content of less than 1 percent.

2. The process of claim 1, further characterized in that said second clears fraction contains a protein content at least 2 percent greater then a patent grade flour milled from said wheat.

3. A process for making a pasta product from wheat, the steps of selecting a high-protein second clear milled fraction, a wheat germ fraction and a relatively low fiber millfeed fraction, blending said fractions in proportions of about 20-25 percent of the wheat germ fraction, 60-70 percent of the second clear fraction and 10-15 percent of the low fiber fraction to obtain a Basic Blend product, finely pulverizing the Basic Blend product, adding a food grade coloring ingredient to the pulverized material, and then subjecting the pulverized material to steps conventionally utilized to produce pasta.

4. The process of claim 3 further characterized in that the food grade coloring ingredient comprises less that about 0.125 percent of titanium dioxide of a Basic Blend product basis.

5. A process for making a food product from wheat comprising a blending wheat germ fraction, a relatively low fiber millfeed wheat fraction and a high-protein second clear milled wheat fraction in proportions of about 20-25 percent of the wheat germ fraction, 10-15 percent of the millfeed fraction and 60-70 percent of the second clear fraction, finely grinding the blend, agglomerating the finely ground blend to an average pellet size that most of the agglomerated particles will pass through a U.S. Standard 08 sieve and will remain on a U.S. Standard 020 sieve, and drying the agglomerated particles at about 170° F. to 350° F. to a moisture content of less than 1 percent.

6. A process for making a food product from wheat comprising blending a wheat germ fraction, a relatively low fiber millfeed wheat fraction and a high-protein second clear milled wheat fraction in proportions of about 20-25 percent of the wheat germ fraction, 10-15 percent of the millfeed fraction and 60-70 percent of the second clear fraction, mixing the blend with an effective amount of water to obtain a moisture content of about 17 percent and heating to about 214° F., pelletizing the hot mix, drying the pellets to a moisture content of about 5 percent, grinding the dried pellets, sifting the ground material through a 0110 Nitex screen and collecting the fines through the Nitex screen as a processed Basic Blend product.

7. The process of claim 6, further characterized in that prior to blending, the wheat germ fraction is comminuted sufficiently to be of a specification of a minimum of 3 percent through a U.S. Standard 070 sieve and a maximum of 11 percent overs on a U.S. Standard 040 sieve, and the millfeed fraction is comminuted sufficiently to be of a specification of a minimum of 10 percent through a U.S. Standard 070 sieve and 100 percent through a U.S. Standard 040 sieve.

8. A process for making a food product from wheat comprising selecting a high-protein second clear milled fraction, a wheat germ fraction and a relatively low fiber millfeed fraction, blending said fractions in proportions of about 20–25 percent of the wheat germ fraction, 60–70 percent of the second clear fraction and 10–15 percent of the low fiber fraction to obtain a Basic Blend product, mixing the Basic Blend product with water and heating, pelletizing the hot mix, drying the pellets and comminuting the dried pellets.

9. The process of claim 8 further characterized in that the comminuted material is subjected to a sifting process to separate out a fine fraction which constitutes a processed Basic Blend.

* * * * *

PO-1050
(5/69)

UNITED STATES PATENT OFFICE
CERTIFICATE OF CORRECTION

Patent No. 3,615,674          Dated October 26, 1971

Inventor(s) Edwin J. Bass and William R. Johnston

It is certified that error appears in the above-identified patent and that said Letters Patent are hereby corrected as shown below:

Column 1, line 20, "producing" should be --procuring--.
Column 2, line 12, delete "15" and insert the word --than--;
line 13, delete "70" and insert the word --invention--; line 63, "On" should be --In--. Column 3, line 22, after "patent" insert the word --grade--. Column 4, line 47, "by" should be --be--.
Column 6, line 48, the total "100.00" should be below the column of % of ingredients. Column 8, line 26, delete the second occurrence of "to"; Claim 1, line 1, "produce" should be --product--.

Signed and sealed this 11th day of April 1972.

(SEAL)
Attest:

EDWARD M. FLETCHER, JR.
Attesting Officer

ROBERT GOTTSCHALK
Commissioner of Patents